United States Patent
Dedow et al.

(10) Patent No.: US 10,047,471 B2
(45) Date of Patent: Aug. 14, 2018

(54) SYSTEMS AND METHODS FOR PREDICTING AND PREVENTING A CABINET STRIKE EVENT IN A WASHING MACHINE APPLIANCE

(71) Applicant: Haier US Appliance Solutions, Inc., Wilmington, DE (US)

(72) Inventors: Gregory Allen Dedow, Louisville, KY (US); Christopher Nils Naber, Louisville, KY (US); Richard Dean Suel, II, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 15/374,231

(22) Filed: Dec. 9, 2016

(65) Prior Publication Data
US 2017/0088997 A1   Mar. 30, 2017

Related U.S. Application Data

(62) Division of application No. 14/079,064, filed on Nov. 13, 2013, now Pat. No. 9,518,351.

(51) Int. Cl.
*D06F 37/20* (2006.01)
*D06F 33/00* (2006.01)
(Continued)

(52) U.S. Cl.
CPC ............ *D06F 37/203* (2013.01); *D06F 33/00* (2013.01); *D06F 37/30* (2013.01); *D06F 37/36* (2013.01); *G05B 19/048* (2013.01); *D06F 33/02* (2013.01); *D06F 2202/00* (2013.01); *D06F 2222/00* (2013.01)

(58) Field of Classification Search
CPC .......... D06F 37/00; D06F 35/00; D06F 33/00; D06F 37/203; D06F 37/36; D06F 2222/00; D06F 2202/00
See application file for complete search history.

(56) References Cited

U.S. PATENT DOCUMENTS 4,556,827 A * 12/1985 Erdman .................. H02P 6/085
                                                          318/400.22
4,741,182 A *  5/1988 Didier .................... G01G 19/00
                                                          68/12.15
(Continued)

*Primary Examiner* — Ramesh Patel
(74) *Attorney, Agent, or Firm* — Dority & Manning, P.A.

(57) ABSTRACT

Systems and methods for predicting and preventing a cabinet strike event in a washing machine appliance are provided. An exemplary method includes ramping a target speed of a motor from a first speed to a second speed over a ramping period. The method includes computing an average deviation of an observed speed of the motor from the target speed over the ramping period. The method includes computing an average power consumption by the motor over the ramping period. The method includes determining whether both the average deviation is greater than a first threshold value and the average power consumption is greater than a second threshold value. The method includes rebalancing the load if both the average deviation is greater than a first threshold value and the average power consumption is greater than a second threshold value. The method includes performing one or more standard operations if both conditions are not satisfied.

7 Claims, 6 Drawing Sheets

(51) Int. Cl.
*G05B 19/048* (2006.01)
*D06F 37/36* (2006.01)
*D06F 37/30* (2006.01)
*D06F 33/02* (2006.01)

(56) References Cited

U.S. PATENT DOCUMENTS

| | | | |
|---|---|---|---|
| 5,713,221 A | 2/1998 | Myers et al. | |
| 6,381,791 B1* | 5/2002 | French | D06F 37/203 68/12.02 |
| 6,578,225 B2* | 6/2003 | Jonsson | D06F 37/203 68/12.02 |
| 6,715,175 B2 | 4/2004 | Ciancimino | |
| 7,296,445 B2* | 11/2007 | Zhang | D06F 37/203 68/12.06 |
| 8,042,211 B2 | 10/2011 | Stansel et al. | |
| 8,543,250 B2* | 9/2013 | Seo | G01D 4/004 700/296 |
| 2006/0242768 A1* | 11/2006 | Zhang | D06F 37/203 8/159 |
| 2008/0134445 A1 | 6/2008 | Cho | |
| 2008/0289118 A1* | 11/2008 | Park | D06F 37/203 8/159 |
| 2011/0030149 A1* | 2/2011 | Cho | D06F 37/306 8/137 |
| 2011/0030460 A1* | 2/2011 | Ashrafzadeh | D06F 33/02 73/65.01 |
| 2011/0098869 A1* | 4/2011 | Seo | G01D 4/004 700/296 |
| 2012/0011661 A1* | 1/2012 | Wauer | D06F 37/203 8/137 |
| 2012/0192450 A1 | 8/2012 | Kim | |
| 2012/0324654 A1* | 12/2012 | Koo | D06F 37/304 8/137 |
| 2013/0091726 A1* | 4/2013 | Kim | D06F 58/22 34/427 |
| 2013/0160216 A1* | 6/2013 | Buendia | D06F 33/02 8/137 |
| 2013/0160221 A1 | 6/2013 | Ashrafzadeh | |
| 2013/0318724 A1* | 12/2013 | Wong | D06F 33/02 8/137 |

\* cited by examiner

SYSTEMS AND METHODS FOR PREDICTING AND PREVENTING A CABINET STRIKE EVENT IN A WASHING MACHINE APPLIANCE

PRIORITY CLAIM

The present application is a divisional of U.S. application Ser. No. 14/079,064 having a filing date of Nov. 13, 2013. Applicant claims priority to and benefit of all such applications and incorporate all such applications herein by reference.

FIELD OF THE INVENTION

The present disclosure relates generally to washing machine appliances. In particular, the present disclosure relates to systems and methods for predicting and preventing a cabinet strike event in a washing machine appliance.

BACKGROUND OF THE INVENTION

Washing machine appliances generally include a drum rotatably mounted within a tub of a cabinet. The drum defines a wash chamber for receiving articles for washing. During operation of washing machine appliances, wash fluid is directed into the tub and onto articles within the wash chamber of the drum. The motor can rotate the drum at various speeds to agitate articles within the wash chamber in wash fluid, to wring wash fluid from articles within the wash chamber, etc.

In particular, after the articles of clothing have been washed, the washing machine can drain the wash fluid and then spin the drum at a high speed in order to relieve the articles of clothing of remaining moisture and fluid. This process is generally known as a spin cycle or a spin out process.

In certain circumstances, prior to a spin cycle, the load in the washing machine can become imbalanced. In particular, the articles of clothing can become disproportionately distributed to a single location and form an out of balance mass. For example, the articles of clothing can adhere together at a single location.

Such out of balance mass can cause a number of problems if it remains uncorrected and present during the spin cycle. In particular, the imbalanced mass can alter the center of mass for the drum and load as a whole so that the center of mass is no longer aligned with a shaft center of the washing machine. Rotating the drum at high speeds, for example during a spin cycle, in such condition can cause undesirable vibration, noise, or other damage to system components, including damage caused by the drum becoming so far misaligned that is strikes the washing machine cabinet.

One potential solution to the problem of out of balance loads can be to measure load size, load imbalance, or other operational parameters prior to performing the spin out process. If such measurements indicate a particularly large load imbalance, then the spin out process can be delayed while the load is rebalanced.

As an example, a washing machine according to the present disclosure can be configured to measure the load size or other operational parameters while the washing machine motor is operated so as to dwell at a relatively low speed, such as, for example, 100 revolutions per minute. However, similar to the spin out process, this measurement process also suffers from the potential occurrence of cabinet strike events.

Therefore, systems and methods for predicting and preventing a cabinet strike event in a washing machine appliance are desirable. In particular, systems and methods for predicting whether cabinet strike events will occur at relatively low dwelling speeds associated with a measurement process are desirable.

BRIEF DESCRIPTION OF THE INVENTION

Additional aspects and advantages of the invention will be set forth in part in the following description, or may be apparent from the description, or may be learned through practice of the invention.

One aspect of the present disclosure is directed to a washing machine appliance. The washing machine appliance includes a cabinet, a tub positioned within the cabinet, and a drum rotatably mounted within the tub. The drum defines a wash chamber for receipt of articles for washing. The washing machine appliance includes a motor in mechanical communication with the drum. The motor is configured for selectively rotating the drum within the tub. The washing machine appliance includes a controller in operative communication with the motor and configured to perform operations. The operations include operating the motor to rotate the drum for a first time period. A target motor speed is ramped from a first speed to a second speed during the first time period. The operations include determining an average deviation of an actual speed of the motor from the target motor speed over the first time period and comparing the average deviation to a first threshold value. The operations include determining an average power consumption of the motor over the first time period and comparing the average power consumption to a second threshold value. The operations include performing a rebalancing process when both the average deviation is greater than the first threshold value and the average power consumption is greater than the second threshold value.

Another aspect of the present disclosure is directed to a method for predicting and preventing a cabinet strike event in a washing machine. The washing machine includes a motor configured to rotate a basket. The method includes operating the motor to rotate the basket for a first time period. A target motor speed is ramped from a first speed to a second speed during the first time period. The method includes determining an average deviation of an actual speed of the motor from the target motor speed over the first time period and comparing the average deviation to a first threshold value. The method includes determining an average power consumption of the motor over the first time period and comparing the average power consumption to a second threshold value. The method includes performing a rebalancing process when both the average deviation is greater than the first threshold value and the average power consumption is greater than the second threshold value. The method includes performing a measurement process when either the average deviation is less than the first threshold value or the average power consumption is less than the second threshold value. The measurement process includes operating the motor to rotate the basket at a third speed that is greater than the second speed.

Another aspect of the present disclosure is directed to a method for determining whether to rebalance a load in a washing machine. The washing machine includes a motor. The method includes ramping a target speed of the motor from 60 revolutions per minute to 90 revolutions per minute over a ramping period. The method includes computing an average deviation of an observed speed of the motor from the target speed over the ramping period. The method includes computing an average power consumption by the motor over the ramping period. The method includes determining whether both the average deviation is greater than a first threshold value and the average power consumption is greater than a second threshold value. The method includes rebalancing the load when it is determined that both the average deviation is greater than the first threshold value and the average power consumption is greater than the second threshold value. The method includes performing one or more standard operations when it is not determined that both the average deviation is greater than the first threshold value and the average power consumption is greater than the second threshold value.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
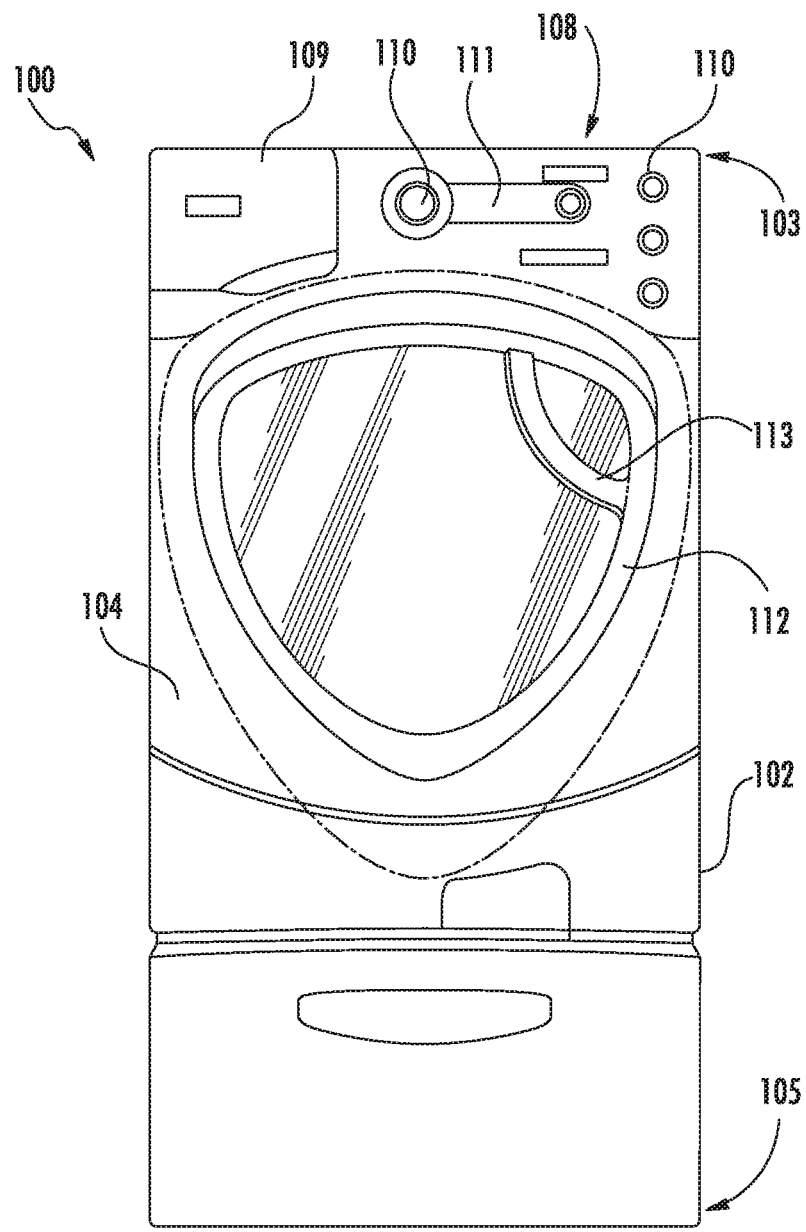
FIG. 1 depicts a front, elevation view of a washing machine appliance according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
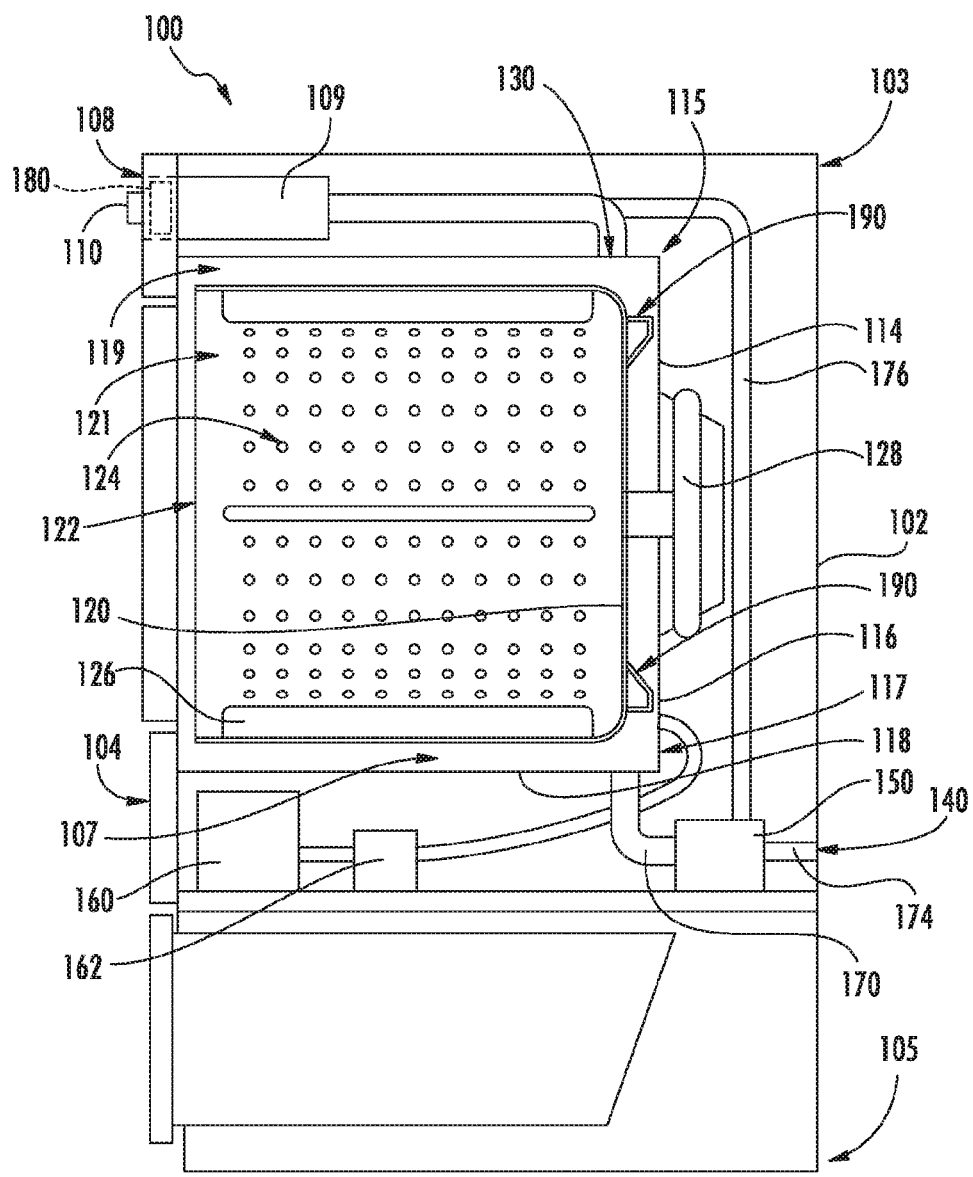
FIG. 2 depicts a side, section view of the exemplary washing machine appliance of FIG. 1.

FIG. 1 provides a front, elevation view of an exemplary horizontal axis washing machine appliance 100. FIG. 2 provides a side, section view of washing machine appliance 100. As may be seen in FIG. 1, washing machine appliance 100 includes a cabinet 102 that extends between a top portion 103 and a bottom portion 105, e.g., along a vertical direction. Cabinet 102 also includes a front panel 104. A door 112 is mounted to front panel 104 and is rotatable about a hinge (not shown) between an open position facilitating access to a wash drum or basket 120 (FIG. 2) located within cabinet 102, and a closed position (shown in FIG. 1) hindering access to basket 120. A user may pull on a handle 113 in order to adjust door 112 between the open position and the closed position.

A control panel 108 including a plurality of input selectors 110 is coupled to front panel 104. Control panel 108 and input selectors 110 collectively form a user interface input for operator selection of machine cycles and features. For example, in one embodiment, a display 111 indicates selected features, a countdown timer, and/or other items of interest to machine users.

Referring now to FIG. 2, a tub 114 defines a wash fluid compartment 119 configured for receipt of a washing fluid. Thus, tub 114 is configured for containing washing fluid, e.g., during operation of washing machine appliance 100. Washing fluid disposed within tub 114 may include at least one of water, fabric softener, bleach, and detergent. Tub 114 includes a back wall 116 and a sidewall 118 and also extends between a top 115 and a bottom 117, e.g., along the vertical direction.

Basket 120 is rotatably mounted within tub 114 in a spaced apart relationship from tub sidewall 118 and the tub back wall 116. Basket 120 defines a wash chamber 121 and an opening 122. Opening 122 of basket 120 permits access to wash chamber 121 of basket 120, e.g., in order to load articles into basket 120 and remove articles from basket 120. Basket 120 also defines a plurality of perforations 124 to facilitate fluid communication between an interior of basket 120 and tub 114. A sump 107 is defined by tub 114 and is configured for receipt of washing fluid during operation of appliance 100. For example, during operation of appliance 100, washing fluid may be urged by gravity from basket 120 to sump 107 through plurality of perforations 124.

A spout 130 is configured for directing a flow of fluid into tub 114. Spout 130 may be in fluid communication with a water supply (not shown) in order to direct fluid (e.g., clean water) into tub 114. A pump assembly 150 (shown schematically in FIG. 2) is located beneath tub 114 for draining tub 114 of fluid. Pump assembly 150 is in fluid communication with sump 107 of tub 114 via a conduit 170. Thus, conduit 170 directs fluid from tub 114 to pump assembly 150. Pump assembly 150 is also in fluid communication with a drain 140 via piping 174. Pump assembly 150 can urge fluid disposed in sump 107 to drain 140 during operation of appliance 100 in order to remove fluid from tub 114. Fluid received by drain 140 from pump assembly 150 is directed out of appliance 100, e.g., to a sewer or septic system.

In addition, pump assembly 150 is configured for recirculating washing fluid within tub 114. Thus, pump assembly 150 is configured for urging fluid from sump 107, e.g., to spout 130. For example, pump assembly 150 may urge washing fluid in sump 107 to spout 130 via hose 176 during operation of appliance 100 in order to assist in cleaning articles disposed in basket 120. It should be understood that conduit 170, piping 174, and hose 176 may be constructed of any suitable mechanism for directing fluid, e.g., a pipe, duct, conduit, hose, or tube, and are not limited to any particular type of mechanism.

A motor 128 is in mechanical communication with basket 120 in order to selectively rotate basket 120, e.g., during an agitation or a rinse cycle of washing machine appliance 100 as described below. Ribs 126 extend from basket 120 into wash chamber 121. Ribs 126 assist agitation of articles disposed within wash chamber 121 during operation of washing machine appliance 100. For example, ribs 126 may lift articles disposed in basket 120 during rotation of basket 120.

A drawer 109 is slidably mounted within front panel 104. Drawer 109 receives a fluid additive (e.g., detergent, fabric softener, bleach, or any other suitable liquid) and directs the fluid additive to wash fluid compartment 119 during operation of washing machine appliance 100. Additionally, a reservoir 160 is disposed within cabinet 102. Reservoir 160 is also configured for receipt of fluid additive for use during operation of washing machine appliance 100 (shown in FIG. 1). Reservoir 160 is sized such that a volume of fluid additive sufficient for a plurality or multitude of wash cycles of washing machine appliance 100 may fill reservoir 160. Thus, for example, a user can fill reservoir 160 with fluid additive and operate washing machine appliance 100 for a plurality of wash cycles without refilling reservoir 160 with fluid additive. A reservoir pump 162 is configured for selective delivery of the fluid additive from reservoir 160 to tub 114.

Also shown in FIG. 2 is a balancing apparatus 190. For example, balancing apparatus 190 can include a balancing ring. The balancing ring can have an annular cavity in which a balancing material is free to rotate and move about. For example, the balancing material can be a fluid such as water or can be balancing balls. The balancing ring can include one or more interior baffles.

Although a single balancing ring or apparatus 190 is shown in FIG. 2, any number of such rings or apparatuses can be included in washing machine appliance 100 and can be placed according to any known or desirable configuration. For example, two balancing rings can be respectively placed at the front and back of basket 120.

Operation of washing machine appliance 100 is controlled by a processing device or controller 180 that is operatively coupled to control panel 108 for user manipulation to select washing machine cycles and features. In response to user manipulation of control panel 108, controller 180 operates the various components of washing machine appliance 100 to execute selected machine cycles and features.

Controller 180 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 180 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 108 and other components of washing machine appliance 100 may be in communication with controller 180 via one or more signal lines or shared communication busses.

Controller 180 is in operative communication with motor 128. Thus, controller 180 can selectively activate and operate motor 128, e.g., depending upon a wash cycle selected by a user of washing machine appliance 100. Controller 180 is also configured for monitoring a power delivered to motor 128. As will be understood by those skilled in the art, power delivered to motor 128 can be measured or determined by controller 180 utilizing various methods. As an example, controller 180 or motor 128 may include a power measurement circuit. In alternative exemplary embodiments, controller 180 may monitor the power delivered to motor 128 utilizing any other suitable mechanism or method including, for example, by measuring an inverter current, a motor phase current, a phase-to-phase voltage or other operating parameters such as a motor efficiency and/or a motor power factor.

Likewise, controller 180 or other processing components of washing machine appliance 100 can determine a current speed of motor 128 according to any known techniques. For example, a speed signal describing the current speed of the motor can be created and provided to controller 180 according to back electromotive force techniques or based on the output of one or more sensors or other components including, for example, an optical sensor or magnetic-based sensors such as hall effect sensors.

In an illustrative example of operation of washing machine appliance 100, laundry items are loaded into basket 120, and washing operation is initiated through operator manipulation of input selectors 110. Tub 114 is filled with water and detergent to form a wash fluid. One or more valves (not shown) can be actuated by controller 180 to provide for filling tub 114 to the appropriate level for the amount of articles being washed. Once tub 114 is properly filled with wash fluid, the contents of basket 120 are agitated with ribs 126 for cleansing of laundry items in basket 120.

After the agitation phase of the wash cycle is completed, tub 114 is drained. Laundry articles can then be rinsed by again adding wash fluid to tub 114, depending on the particulars of the cleaning cycle selected by a user, ribs 126 may again provide agitation within wash chamber 121. One or more spin cycles may also be used. In particular, a spin cycle may be applied after the wash cycle and/or after the rinse cycle in order to wring wash fluid from the articles being washed. During a spin cycle, basket 120 is rotated at relatively high speeds.

While described in the context of a specific embodiment of horizontal axis washing machine appliance 100, it will be understood that horizontal axis washing machine appliance 100 is provided by way of example only. Other washing machine appliances having different configurations, different appearances, and/or different features may also be utilized with the present subject matter as well, including, for example, vertical axis washing machine appliances. Thus, the teachings of the present disclosure are not limited to use with washing machine appliance 100.

Figure 3:
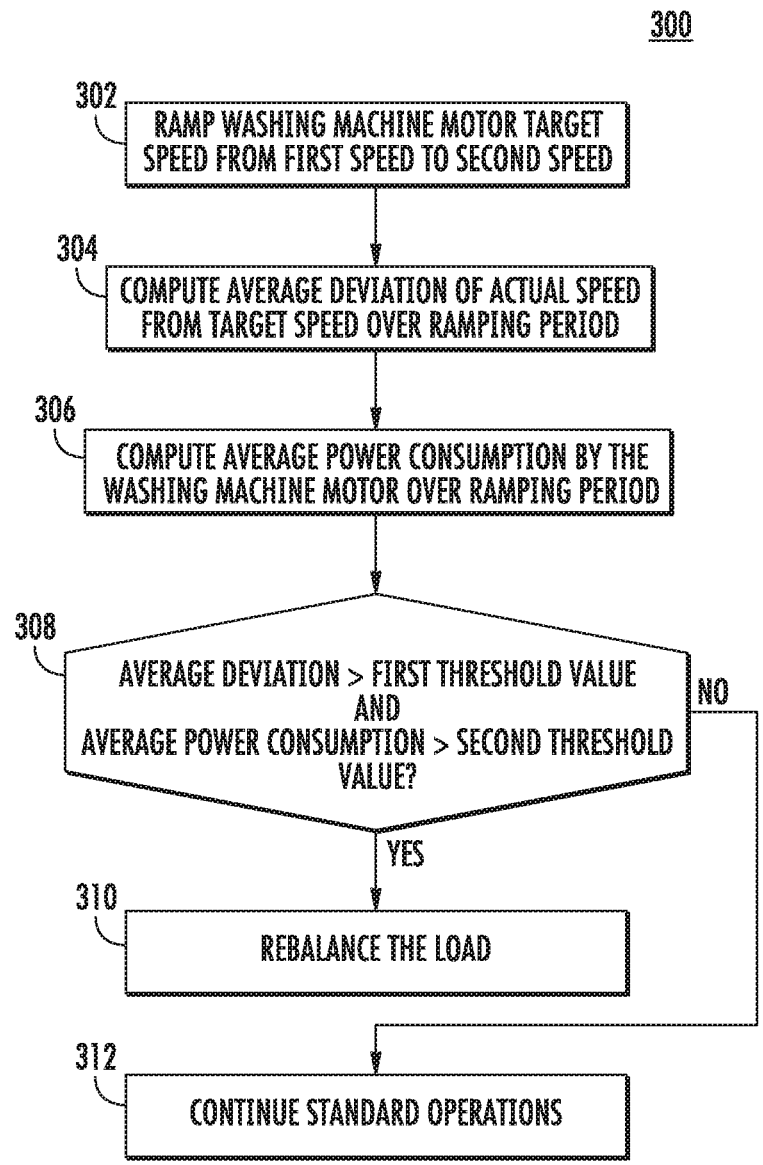
FIG. 3 provides a flow chart of an exemplary method for operating a washing machine appliance according to an exemplary embodiment of the present disclosure.

FIG. 3 depicts an exemplary method (300) for operating a washing machine appliance according to an exemplary embodiment of the present disclosure. Method (300) can be implemented using any suitable appliance, including, for example, washing machine appliance 100 of FIG. 1.

In addition, FIG. 3 depicts steps performed in a particular order for purposes of illustration and discussion. Those of ordinary skill in the art, using the disclosures provided herein, will understand that the various steps method (300)

can be omitted, adapted, and/or rearranged in various ways without departing from the scope of the present disclosure.

At (302) the target speed of the washing machine motor can be ramped from a first speed to a second speed. As an example, the target speed of the washing machine motor can be ramped from 60 revolutions per minute (RPM) to 90 RPM over a ramping period. In some implementations, the target speed of the washing machine motor can be ramped at about 10 RPM per second, such that the ramping period is about 3 to 4 seconds in duration.

Generally, as will be discussed further below, ramping from the first speed to the second speed should provide sufficient rotation of the basket or drum such that data can be collected for predicting a cabinet strike event. However, a speed should not be reached at which a cabinet strike event might actually occur. First and second speeds of 60 RPM and 90 RPM satisfy these goals.

At (304) an average deviation of the actual speed of the motor from the target speed of the motor over the ramping period can be computed. In particular, a plurality of samples of the deviation of the actual motor speed from the target motor speed can be collected while the target speed is ramped from the first speed to the second speed (e.g. during the ramping period). For example, actual motor speed can be determined based on feedback from one or more sensors such as optical sensors or magnetometers or can be computed based on back electromotive force data.

Each sample of the deviation can be determined by comparing the actual motor speed observed at the time of sampling to the target motor speed in effect at the time of sampling. For example, the deviation can be an absolute value of the difference between actual and target motor speeds.

Thus, at (304) an average deviation exhibited by all collected samples can be computed. As an example, a running average of the deviation can be computed in real-time during the ramping period. As another example, the average can be computed after the ramping period has been completed.

Figure 4:
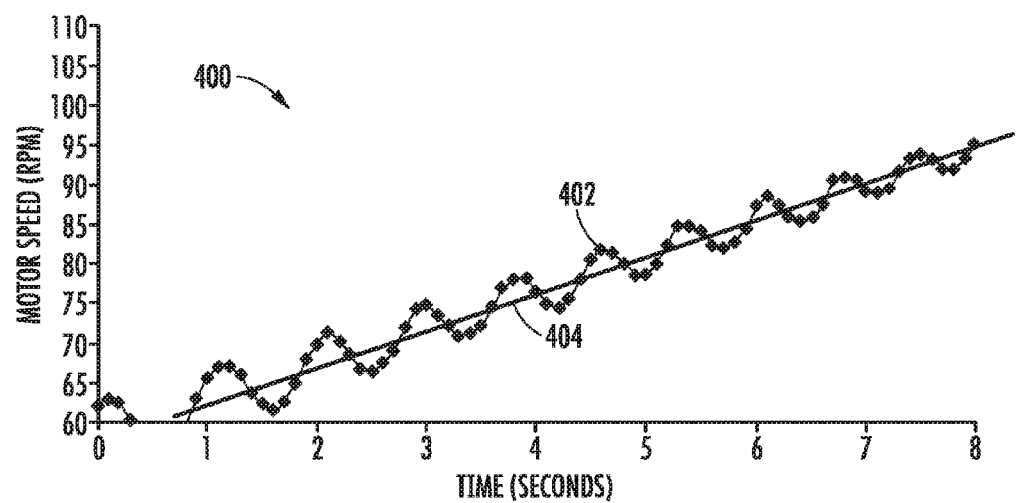
FIG. 4 provides a graphical depiction of actual motor speed versus time for an exemplary washing machine appliance.

As an example, FIG. 4 provides a graphical depiction 400 of actual motor speed 402 versus time for an exemplary washing machine appliance. More particularly, graphical depiction 400 depicts actual motor speed 402 as a target motor speed 404 is ramped from about 60 RPM to about 90 RPM. As can be seen, the actual motor speed 402 fluctuates about the target motor speed 404 in a periodic fashion due to the natural operating parameters and environmental factors of the washing machine appliance.

The motor speed data depicted in FIG. 4 was collected from an exemplary washing machine appliance containing a total load of about 12 pounds with 0 pounds of such load being out of balance. Thus, the load was evenly distributed.

Figure 5:
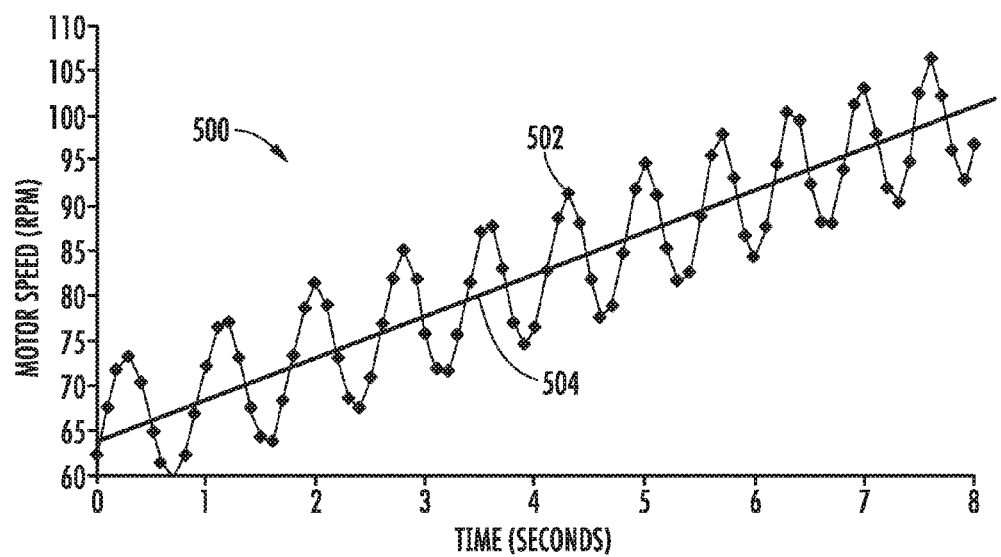
FIG. 5 provides a graphical depiction of actual motor speed versus time for an exemplary washing machine appliance.

Likewise, FIG. 5 provides a graphical depiction 500 of actual motor speed 502 versus time for an exemplary washing machine appliance. More particularly, graphical depiction 500 depicts actual motor speed 502 as a target motor speed 504 is ramped from about 60 RPM to about 90 RPM.

The motor speed data depicted in FIG. 5 was collected from an exemplary washing machine appliance containing a total load of about 7.5 pounds with all 7.5 pounds of such load being out of balance. Therefore, the load associated with the data depicted in FIG. 5 is significantly more out of balance than the load associated with the data depicted in FIG. 4.

As can be seen by comparing FIG. 4 and FIG. 5 to each other, the actual motor speed 502 of FIG. 5 demonstrates a significantly larger deviation from target speed 504 than actual motor speed 402 of FIG. 4 demonstrates with respect to target speed 404. In particular, the larger out of balance mass included in the washing machine appliance associated with FIG. 5 significantly increases such deviation while the balanced mass associated with FIG. 4 does not result in a significant deviation.

Returning to FIG. 3, at (306) an average power consumption of the washing machine motor over the ramping period can be computed. In particular, a plurality of samples of motor power consumption can be collected while the target speed is ramped from the first speed to the second speed (e.g. during the ramping period). Motor power consumption can be computed based on various operating characteristics including, for example, an inverter current, a motor phase current, a phase-to-phase voltage, or by using various sensors including, for example, a wattmeter and/or an ammeter.

Thus, at (306) an average power consumption exhibited by all samples collected during the ramping period can be computed. As an example, a running average of the power consumption can be computed in real-time during the ramping period. As another example, the average can be computed after the ramping period has been completed.

Figure 6:
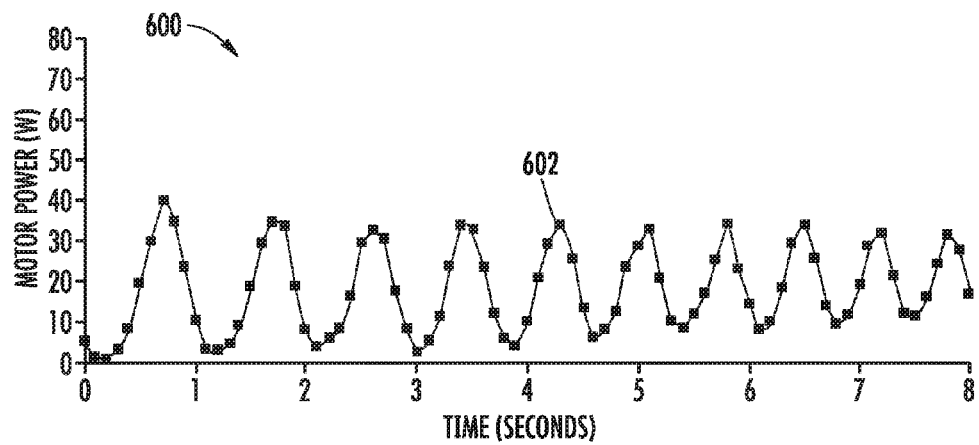
FIG. 6 provides a graphical depiction of motor power consumption versus time for an exemplary washing machine appliance.

As an example, FIG. 6 provides a graphical depiction 600 of motor power consumption 602 versus time for an exemplary washing machine appliance. More particularly, graphical depiction 600 depicts motor power consumption 602 as the target motor speed is ramped from about 60 RPM to about 90 RPM. As can be seen, the motor power consumption 602 fluctuates in a periodic fashion due to the natural operating parameters and environmental factors of the washing machine appliance.

The power consumption data depicted in FIG. 6 was collected from an exemplary washing machine appliance containing a total load of about 12 pounds with 0 pounds of such load being out of balance.

Figure 7:
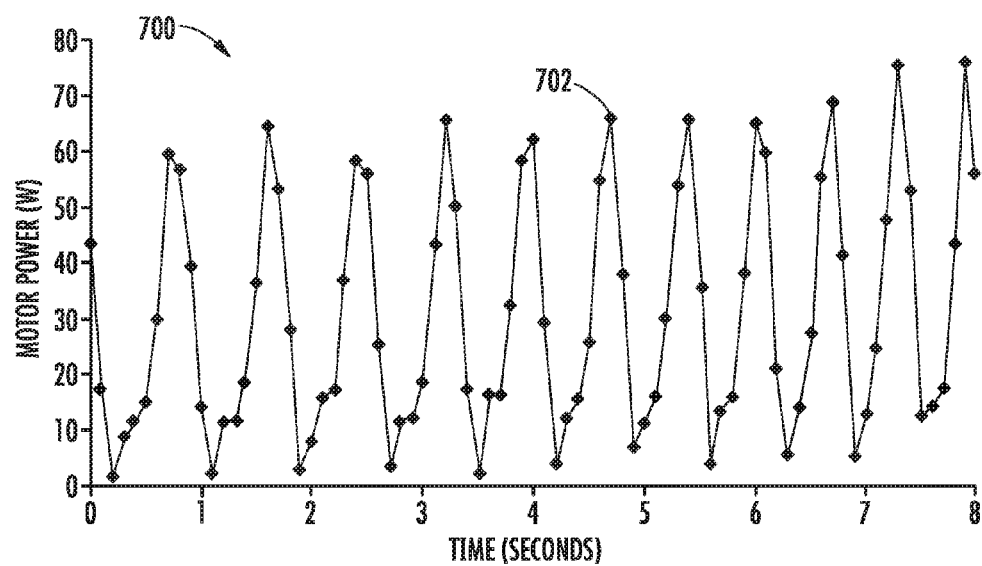
FIG. 7 provides a graphical depiction of motor power consumption versus time for an exemplary washing machine appliance.

Likewise, FIG. 7 provides a graphical depiction 700 of motor power consumption 702 versus time for an exemplary washing machine appliance. More particularly, graphical depiction 700 depicts motor power consumption 702 as the target motor speed is ramped from about 60 RPM to about 90 RPM.

The power consumption data depicted in FIG. 7 was collected from an exemplary washing machine appliance containing a total load of about 7.5 pounds with all 7.5 pounds of such load being out of balance. Therefore, the load associated with the data depicted in FIG. 7 is significantly more out of balance than the load associated with the data depicted in FIG. 6.

As can be seen by comparing FIG. 6 and FIG. 7 to each other, the motor power consumption 702 of FIG. 7 demonstrates significantly larger local maximums (e.g. ranging from about 60 to 80 Watts) than the local maximums demonstrated by motor power consumption 602 of FIG. 6 (e.g. ranging from about 30 to 40 Watts). In particular, the larger out of balance mass included in the washing machine appliance associated with FIG. 7 significantly increases the power consumed by the motor to rotate the basket during certain portions of the rotational period. On the other hand, the balanced load associated with FIG. 6 does not result in such a significant increase in power consumption.

Figure 8:
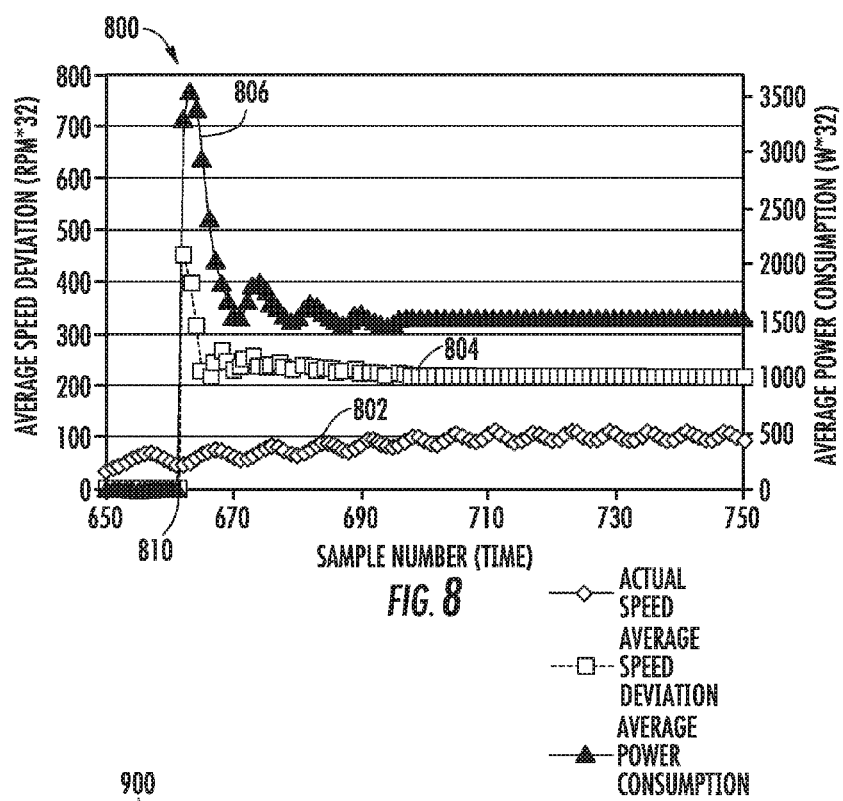
FIG. 8 provides a graphical depiction of various operational parameters versus time for an exemplary washing machine appliance according to an exemplary embodiment of the present disclosure.

FIG. 8 provides a graphical depiction 800 of various operational parameters versus time for an exemplary washing machine appliance according to an exemplary embodiment of the present disclosure. In particular, graphical depiction 800 shows actual motor speed 802 in conjunction with a plot 804 of a running average of speed deviation and a plot 806 of a running average of power consumption.

As shown on the left-hand vertical axis of graphical depiction 800, the plot 804 of the running average of speed deviation is shown in units of revolutions per minute times 32. This numerical format can be used to retain decimal-level accuracy when certain operations of the present disclosure are performed using binary representations of the operating parameters. However, such formatting is provided by way of example only and the systems and methods of the present disclosure can be performed according to any suitable numerical formatting or representation.

Likewise, as shown on the right-hand vertical axis of graphical depiction 800, the plot 806 of the running average of power consumption is shown in units of Watts times 32 for similar reasons as those discussed above with respect to plot 804. The actual motor speed 802 is not to scale in terms of units with respect to either plot 804 or plot 806 and is therefore provided for the purposes of explanation only.

As depicted in FIG. 8, computation of the running average of speed deviation can begin at time 810 when the actual motor speed 802 reaches a first speed of the ramping period. As an example, the first speed at which the computation of the running averages begin can be 60 RPM.

Samples of the deviation of the actual motor speed 802 from the target motor speed can be collected while actual motor speed 802 is ramped to a second speed. For example, the second speed can be 90 RPM. A running average of the collected samples can be calculated in real-time, as shown by plot 804. In particular, the running average of speed deviation can be a cumulative running average of all collected samples.

Likewise, the running average of motor power consumption can also begin being computed at time 810. Samples of the motor power consumption can be collected while actual speed 802 is ramped to a second speed. A running average of the collected samples of motor power consumption can be calculated in real-time, as shown by plot 806. In particular, the running average of power consumption can be a cumulative running average of all collected samples.

Once the actual motor speed 802 reaches the second speed at time 820, computation of the running average of speed deviation and the running average of power consumption can cease. Thus, the most recently computed values for the running average of speed deviation and the running average of power consumption at time 820 can be used as the final averages over the ramping period.

It should be appreciated, however, that the data provided in FIGS. 4, 5, 6, 7, 8, and 9 are representative of an exemplary embodiment of a washing machine. The present disclosure is in no way limited to the particular values shown by such data. As different washing machine appliances have varying components, designs, attributes, operational parameters, or other design variables or objectives, application of the teachings and disclosures of the present disclosure to different washing appliances can result in varying operational data and threshold limits.

Returning to FIG. 3, at (308) it can be determined whether both the average deviation is greater than a first threshold value and the average power consumption is greater than a second threshold value. For example, the first and second threshold values can be retrieved from memory such as a lookup table or can be computed according to a transfer function.

If it is determined that both the average deviation is greater than the first threshold value and the average power consumption is greater than the second threshold value then method (300) can proceed to (310) and rebalance the load. In particular, if both the average power consumption and the average speed deviation are greater than their respective threshold values, then it can be assumed that the load contains an unacceptably large imbalance. Therefore, the rebalancing process should be performed prior to continuing standard operations, such as a measurement process or a high speed spin cycle. In such fashion, a cabinet strike event that would likely occur during such standard operations can be avoided.

Rebalancing the load at (310) can include any operational process or technique that provides for a rebalancing of the load. For example, the basket can rotate slowly to allow the out of balance mass to tumble down and be disrupted. Generally, any known technique to rebalance the load can be performed at (310).

However, if it is determined that either the average deviation is not greater than the first threshold value or the average power consumption is not greater than the second threshold value, the method (300) can proceed to (312) and continue with standard operations. In particular, if one or both of the average deviation or average power consumption are less than their respective threshold values, then it can be assumed that the load does not contain an unacceptably large imbalance. Therefore, as an example, a measurement process which dwells at a relatively low speed can be performed at (312) without experiencing a cabinet strike event. For example, the measurement process can include operating the motor to rotate at about 100 RPM. As another example, the standard operations performed at (312) can include any known process or technique for reducing the fluid content of the articles of clothing in the basket, including spinning the basket at a high speed.

Figure 9:
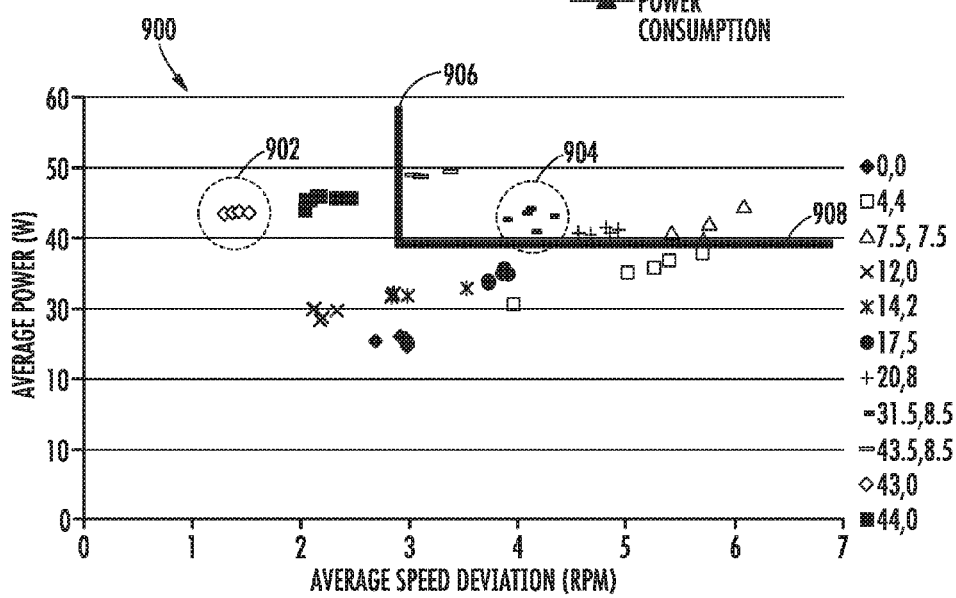
FIG. 9 provides a graphical depiction of average power consumptions and average speed deviations for an exemplary washing machine appliance according to an exemplary embodiment of the present disclosure.

As an example, FIG. 9 provides a graphical depiction 900 of average power consumptions and average speed deviations for an exemplary washing machine appliance according to an exemplary embodiment of the present disclosure. In particular, graphical depiction 900 shows a plurality of measurements of average power consumption and average speed deviation for a plurality of different load sizes and load imbalances as the washing machine motor is ramped from about 60 RPM to about 90 RPM. Shown on the vertical axis is average power consumption and shown on the horizontal axis is average speed deviation.

The plotted measurements correspond to the load values shown on the right-hand side of graphical depiction 900 which are presented in the format of (total load, out of balance load). For example, dataset 902 includes five different measurements of average power consumption and average speed deviation for a washing machine ramping a total load of 43 pounds with zero of the load being out of balance. As another example, dataset 904 includes five different measurements of average power consumption and average speed deviation for a washing machine ramping a total load of 31.5 pounds with 8.5 pounds of such total load being out of balance.

Also shown in graphical depiction 900 are first threshold value 906 and second threshold value 908. In particular, first threshold value 906 can be a threshold speed deviation value, such as, for example, about 2.4 or 3 RPM. Likewise, second threshold value 908 can be a threshold power consumption value, such as, for example, 37.5 Watts. However, other threshold values can be used for various washing machine appliances.

As discussed with respect to (308)-(312) of FIG. 3, if both the average speed deviation is greater than the first threshold value 906 and the average power consumption is greater than the second threshold value 908, then it can be predicted that a cabinet strike event is likely to occur and, therefore, the load can be rebalanced. However, if either the average speed deviation is less than first threshold value 906 or average power consumption is less than second threshold value 908, then it can be predicted that a cabinet strike event is not likely to occur and, therefore, the washing machine appliance can proceed to perform standard or previously scheduled operations. With reference to graphical depiction 900, this means that measurements within the upper-right region of graphical depiction 900 will result in a rebalancing process while measurements that do not fall within such region will result in the continued performance of standard operations, such as, for example, a low speed measurement process and/or a high speed spin out process.

One of skill in the art, in light of the disclosures provided herein, will appreciate that the data provided by the plurality of measurements of average power consumption and average power deviation depicted in graphical depiction 900 can be test measurements that are used to design, select, or otherwise obtain the threshold values 906 and 908. In particular, such threshold values have been designed so as to assist in classifying later observed average power consumption and average speed deviation data as generally indicative of a load that will cause a cabinet strike event or a load that will not cause a cabinet strike event. Thus, for example, whether a cabinet strike event occurred during a low speed measurement process performed following each of the plurality of measurements can be used to identify the appropriate threshold values 906 and 908.

It will be appreciated, however, that the particular threshold values 906 and 908 are exemplary in nature and are driven by the particular design goals, constraints, and operating parameters of a particular exemplary washing machine appliance.

Instead, according to aspects of the present disclosure, threshold values can be designed, selected, or obtained to assist in classifying later observed average power consumption and average speed deviation data as indicative of acceptable load characteristics or unacceptable load characteristics. Such acceptable load characteristics can generally be based on machine capabilities, design choices with respect to noise, vibration, or any other attributes, operational parameters, or other design variables or objectives. In particular, the determination of appropriate threshold values can be driven by the goal of predicting and preventing cabinet strike events. As such, the selection of threshold values can also take into account measurement process speed, measurement process duration, spin cycle speed, spin cycle duration, balancing apparatus capabilities, component reliabilities, wet load dynamics, or other system component variation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for predicting and preventing a cabinet strike event in a washing machine, the washing machine comprising a motor configured to rotate a basket, the method comprising:
    operating the motor to rotate the basket according to a target motor speed for a first time period, wherein the target motor speed is ramped from a first speed to a second speed during the first time period;
    determining an average deviation of an actual speed of the motor from the target motor speed over the first time period;
    comparing the average deviation to a first threshold value;
    determining an average power consumption of the motor over the first time period;
    comparing the average power consumption to a second threshold value;
    performing a rebalancing process when both the average deviation is greater than the first threshold value and the average power consumption is greater than the second threshold value; and
    performing a measurement process when either the average deviation is less than the first threshold value or the average power consumption is less than the second threshold value, wherein the measurement process comprises operating the motor to rotate the basket at a third speed that is greater than the second speed.

2. The method of claim 1, wherein the first speed comprises about 60 revolutions per minute, the second speed comprises about 90 revolutions per minute, and the third speed comprises about 100 revolutions per minute.

3. The method of claim 1, wherein the first time period has a duration of about three or four seconds.

4. The method of claim 1, wherein the target motor speed is ramped from the first speed to the second speed at a rate of about 10 revolutions per minute per second during the first time period.

5. The method of claim 1, wherein the first threshold value is about 2.4 or 3 revolutions per minute.

6. The method of claim 1, wherein the second threshold value is about 37.5 Watts.

7. The method of claim 1, further comprising respectively calculating the first and second threshold values based on a rate at which the target speed of the motor is ramped from the first speed to the second speed.

* * * * *